(12) United States Patent
Stavely et al.

(10) Patent No.: US 7,443,421 B2
(45) Date of Patent: Oct. 28, 2008

(54) CAMERA SENSOR

(75) Inventors: Donald J. Stavely, Windsor, CO (US); Mark E. Wanger, Ft. Collins, CO (US); James H. Anderson, Fort Collins, CO (US); Casey L. Miller, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 11/099,149

(22) Filed: Apr. 5, 2005

(65) Prior Publication Data
US 2006/0221194 A1 Oct. 5, 2006

(51) Int. Cl.
*H04N 5/228* (2006.01)
(52) U.S. Cl. ................................ 348/208.1
(58) Field of Classification Search ............ 348/208.99, 348/208.1, 208.6
See application file for complete search history.

(56) References Cited

U.S. PATENT DOCUMENTS

| 6,088,055 | A | 7/2000 | Lareau et al. |
| 7,102,679 | B1* | 9/2006 | Spears et al. ............... 348/312 |
| 2004/0189837 | A1* | 9/2004 | Kido ........................ 348/241 |

FOREIGN PATENT DOCUMENTS

| EP | 0 897 596 | 2/1999 |
| GB | 2 298 542 | 9/1996 |

OTHER PUBLICATIONS

Internation Search Report for Application No. PCT/US2006/012210. Report issued Jul. 5, 2006.

* cited by examiner

*Primary Examiner*—Lin Ye
*Assistant Examiner*—Amy Hsu

(57) ABSTRACT

A camera has a motion detector and a sensor with a plurality of pixels. Each pixel includes shift transistors to shift charge between pixels as a function of motion sensed by the motion detector.

15 Claims, 4 Drawing Sheets

CAMERA SENSOR

BACKGROUND

One factor in the sharpness of a picture is movement on the part of the photographer ("camera shake"). This is especially true at longer focal lengths. A rule of thumb from 35 mm film photography is that hand-held exposures should be less than one over the focal length in seconds.

One way of addressing this limitation is to use a faster lens, allowing shorter exposure time for the same scene brightness. Digital cameras, however, already use the fastest lens practical, consistent with cost, size and image quality goals. Values of F/2 to F/2.8 are typical. Faster lenses than these are much more bulky and expensive.

Active image stabilization of the lens can also be used to minimize camera shake. In an image-stabilized lens, motion is sensed (e.g., by a solid-state gyroscope) and an optical element within the lens is moved in such a way that the image path is deflected slightly in the direction opposite the camera motion. In one approach, the element is driven by two "voice coil" type actuators, responding to signals from gyros or accelerometers sensing horizontal and vertical motion. One approach has been to use a liquid-filled prism. Actuators squeeze the prism by the edge, refracting the beam in the direction of the thicker side of the prism. Another approach shifts the lenses within the optical path to adjust for movement.

While these approaches work, they take up space within the lens and add bulk and expense. In particular, the liquid prism approach adds a separate, additional element that must be placed into the optical path.

It is also possible to move the sensor itself in response to camera motion. This is difficult, however, because the interconnect to the sensor hinders a compliant suspension in both horizontal and vertical directions. Also, the suspension should be very accurate and stiff in all of the other degrees of freedom, particularly the tilt axes.

DESCRIPTION OF THE EMBODIMENTS

In the following detailed description, reference is made to the accompanying drawings which form a part hereof, and in which is shown by way of illustration specific embodiments. It is to be understood that other embodiments may be utilized and structural changes may be made without departing from the scope of the presently disclosed subject matter.

Figure 1:
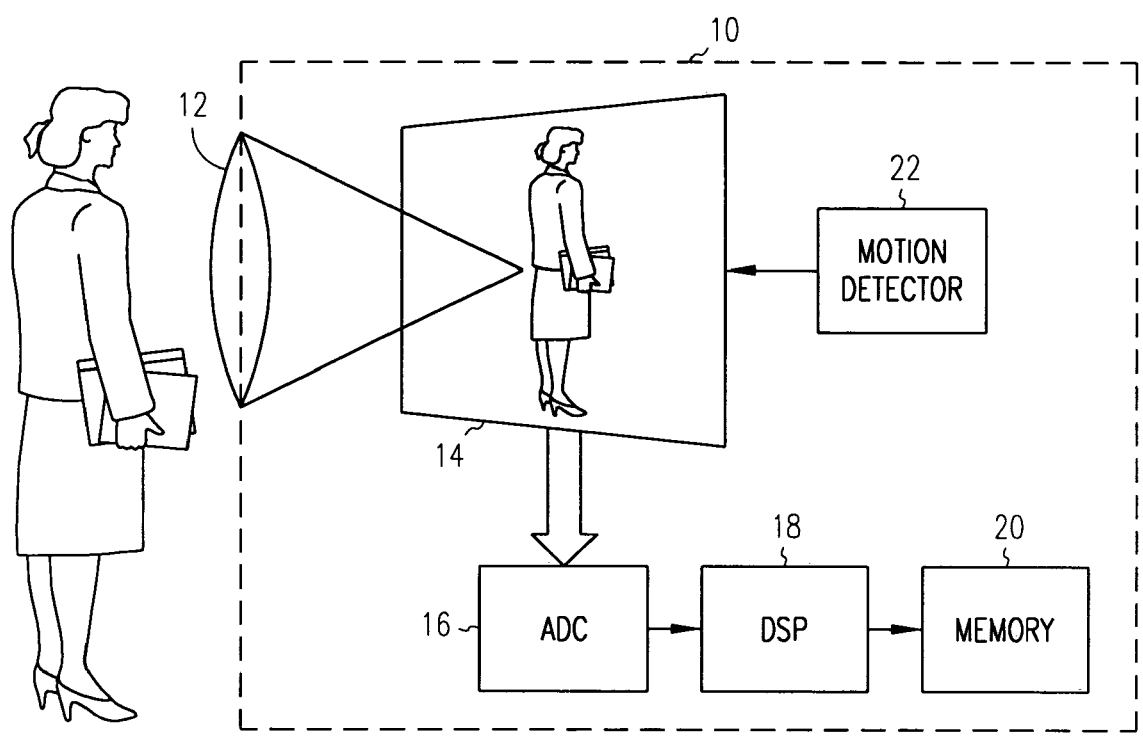
FIG. 1 illustrates an embodiment of a digital camera having a sensor with electronic image stabilization.

A digital camera 10 is shown in FIG. 1. In the camera of FIG. 1, a lens 12 projects an image on a sensor 14 having two or more sensor pixels. Sensor 14 converts the light to a voltage proportional to the brightness and that voltage is passed through an analog-to-digital converter (ADC) 16, which translates the voltage into a digital value. That value is passed to a digital signal processor (DSP) 18, which adjusts exposure, color balance and tone reproduction. The image is them compressed before being written to the storage medium and/or memory 20.

Sensor 14 is connected to motion detector circuit 22. Electronic image stabilization is used commonly in video camcorders. Rather than move an optical element, the image captured by the sensor is "moved". The video frame is initially centered on a somewhat oversized sensor area. As the image moves on the sensor, successive frames are read out offset from the center position, based on the direction and amount of image motion.

One approach to electronic stabilization is to construct a single, high resolution image from multiple shorter exposures, with the appropriate offset to account for camera motion between exposures. One issue with such an approach is that the amount of time needed to read out data from the high resolution sensors used in digital still cameras (the sensor readout period) is long. For some sensors the sensor readout time may be more than 100 ms. Successive exposures would be separated in time by the readout period. Such a delay would impact the correlation between the frames, resulting in unacceptable results for all but perfectly static scenes.

Noise is another issue faced when trying to apply successive frame electronic image stabilization to still images. A series of short exposures is not equal to one longer exposure. Each short exposure has its own thermal, shot, and readout noise. This noise adds as the square root of the number of exposures. For example, four $1/200$ sec exposures will have at least twice the noise of a single $1/50$ sec exposure.

Camera 10 implements electronic image stabilization while minimizing the time delay and noise characteristic of the multiple sub-exposure image stabilization technique described above. Instead, charge within sensor 14 is shifted from pixel to pixel to follow the moving image during the exposure. Charge movement, such as happens during the readout of a Charge Coupled Device (CCD), is a relatively noise-free operation. Only when the charge is converted to a voltage at the end of the exposure is the readout noise incurred.

A sensor 14 which transfers charge as a function of camera movement will be described next.

Figure 2A:
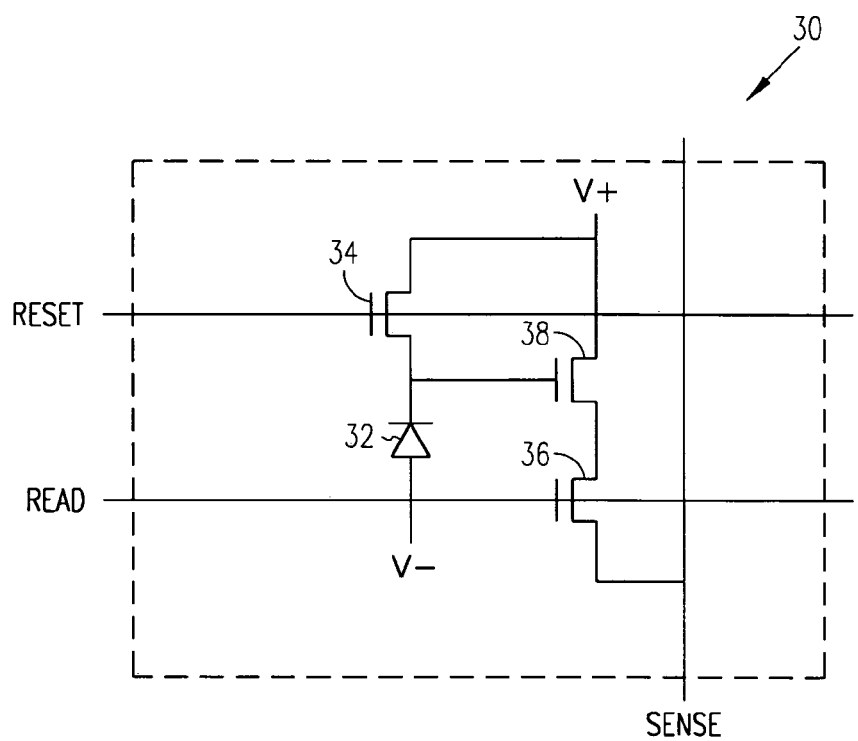
FIGS. 2A, 2B and 3 illustrate a pixel design which can be used in the sensor of FIG. 1.
Figure 2B:
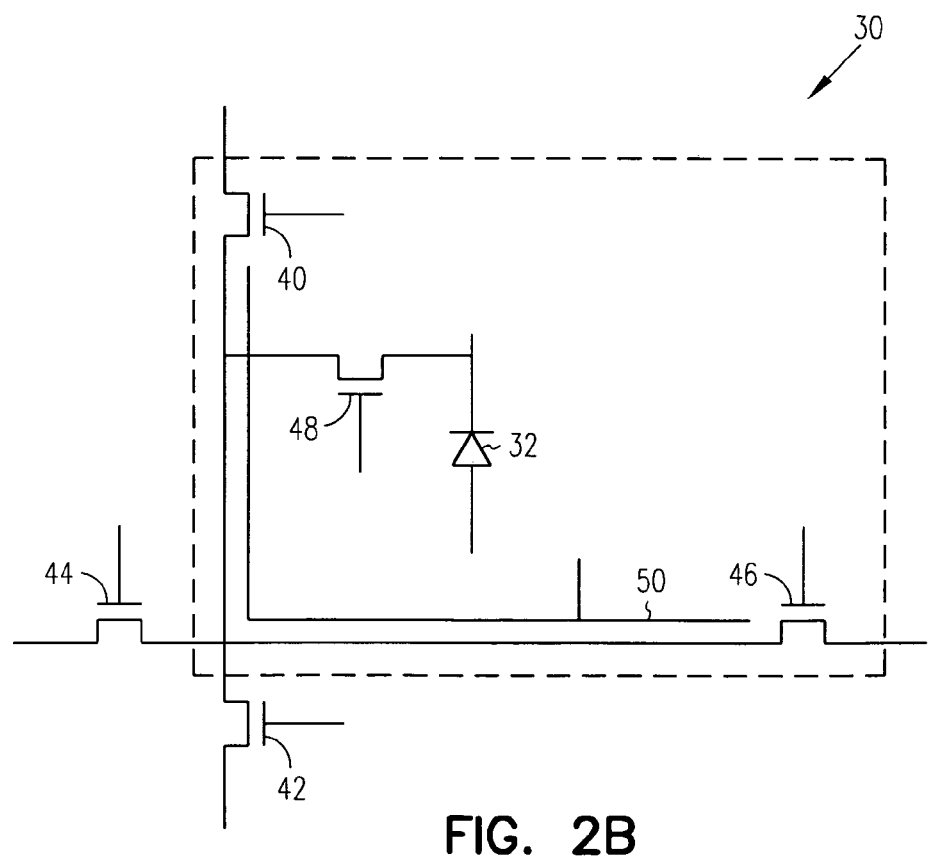

In one embodiment, sensor 14 is a hybrid of CCD and CMOS sensor technologies. One such embodiment is shown in FIGS. 2A and 2B, where sensor 14 includes two or more sensor pixels 30. Each sensor pixel 30 includes a photodiode 32 and at least three transistors: a reset transistor 34, a read transistor 36, and charge-sense (source follower) transistor 38. In the embodiment shown, photodiode 32 and transistors 34, 36 and 38 are formed using a CMOS process.

Figure 3:
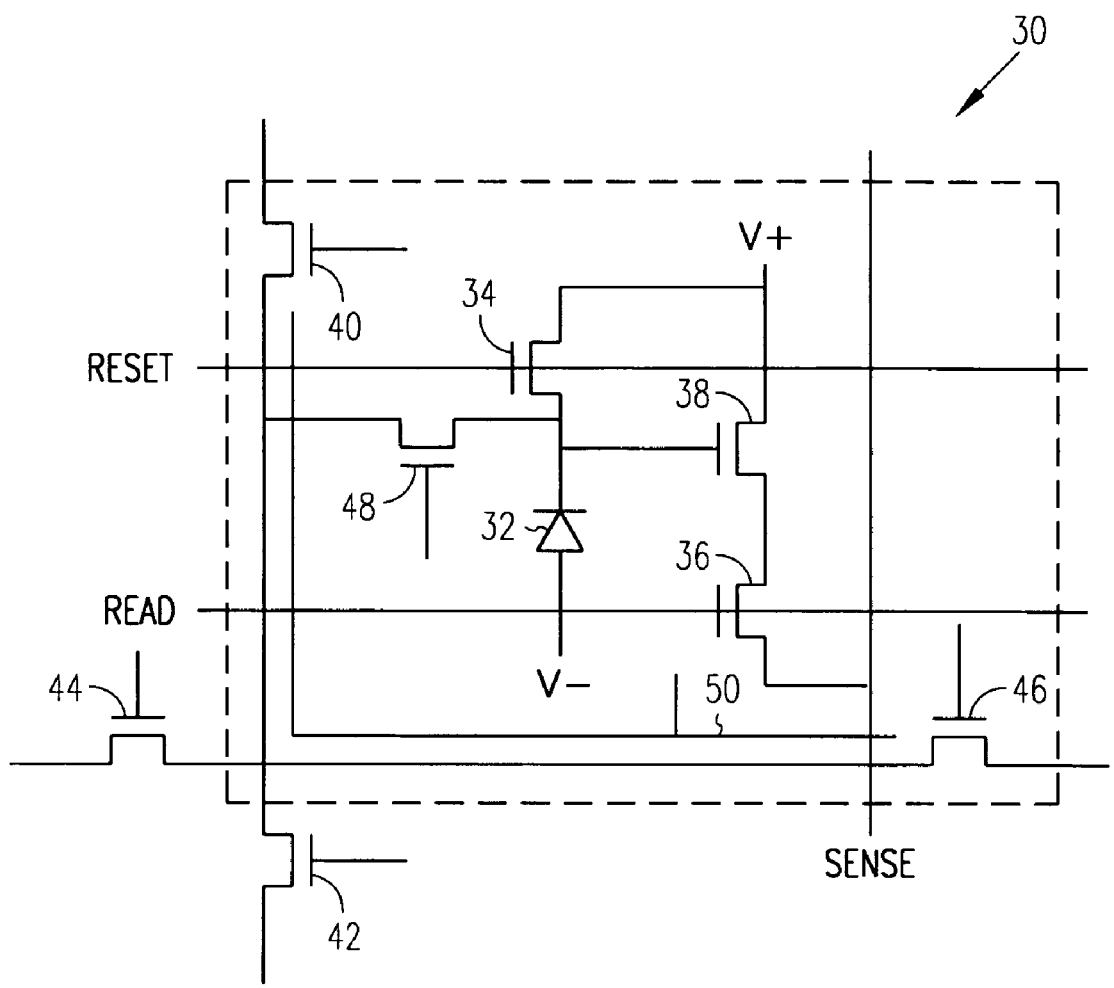

In the embodiment shown in FIGS. 2A, 2B and 3, each sensor pixel 30 contains transistors 40, 42, 44, 46, 48 and 50 used to move charge to adjacent pixels. In the embodiment shown, L-shaped transistor 50 spans a substantial portion of the length and width of pixel 30 such that all the charge paths are covered with overlapping gates (polysilicon), such that they act as a Charge Coupled Device (CCD). This ensures transfer of substantially all the charge while minimizing the noise penalties described above. The gate connection for transistor 50 is shown just under transistor 36.

By appropriate clocking of the transfer gates, charge can be shifted from pixel to pixel without significant loss.

Figure 4:
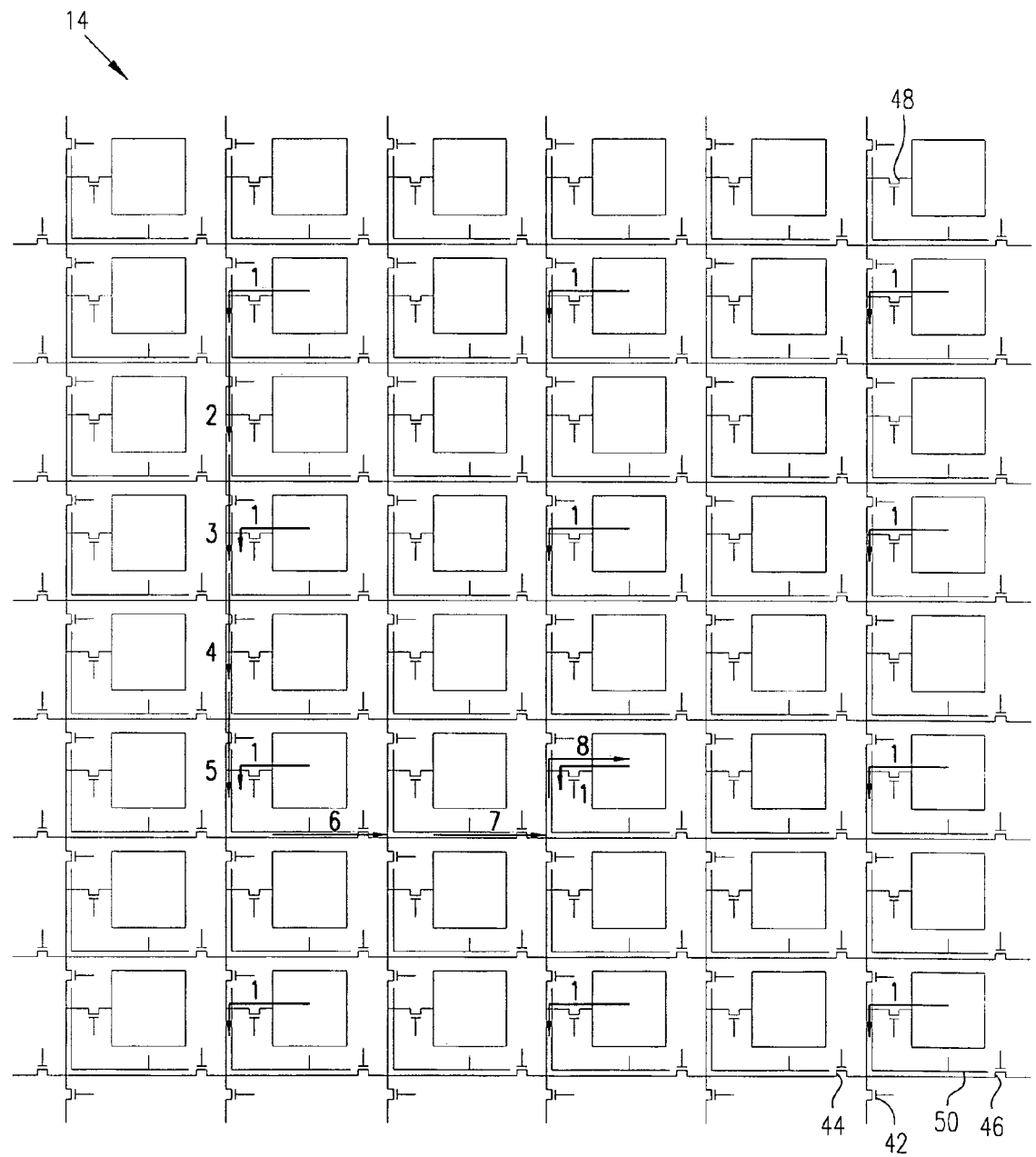
FIG. 4 illustrates transfer of charge between sub-exposures in an embodiment of the sensor of FIG. 1.

Image stabilization is accomplished by shifting charge between sub-exposures in response to inputs from camera motion sensors within motion detector 22. One embodiment is illustrated in FIG. 4. Each exposure is divided into two or more sub-exposures. Charge may be transferred, if desired, to adjacent pixels 30 after each of the four sample periods. For example, a $1/30^{th}$ of a second exposure could be divided into four smaller sub-exposures of $1/120^{th}$ of a second each. This provides two stops-worth of motion reduction—i.e. $1/120^{th}$ of a second sharpness while achieving $1/30^{th}$ of a second image quality (noise). Additional increases in image quality are possible by dividing the exposure into even more sub-exposures.

Some sensors 14 use a Bayer color filter pattern, in which the pixels 30 are arranged as a repeated 2 by 2 array of red-green and blue-green pixels 30 arranged, for example, as red and green pixels in a first row and green and blue pixels in a second row. Such an embodiment is shown in FIG. 4.

As in the previous example, image stabilization in such a sensor 14 is accomplished by shifting charge after each sub-exposure, in response to inputs from camera motion sensors within motion detector 22. Here, however, charge must be shifted not to the immediate neighbor to the left, right, up, and down; but rather two pixels to the left, right, up, or down. That is, pixel charge should be transferred to like-color pixels 30. An example of this is shown in FIG. 4.

Shifting must be done in multiple steps in order to 1) preserve like colors across a color mosaic pattern, and 2) allow multiple pixel shifts between sub-exposures. This is best shown by example. FIG. 4 illustrates a transfer of the Green-2 pixels in the Bayer pattern, shifted down two positions and right one position.

Charge is accumulated in each pixel during a sub-exposure. Charge in each pixel is shifted to adjacent pixels 30 as necessary by applying clocking signals to the transfer gates arranged between the pixels 30.

As the arrows indicate in FIG. 4, in the embodiment shown, each charge transfer takes eight phases of the appropriate clock lines. Note that all Green-2 pixels in the array are moved simultaneously. Each of the other three colors in the Bayer pattern are moved in the same way. Thus for this example, thirty-two (8×4=32) clock phases are required to shift the entire array between each sub-exposure.

The above description is illustrative, and not restrictive. Many other embodiments will be apparent to those of skill in the art upon reviewing the above description.

The Abstract is provided to comply with 37 C.F.R. §1.72(b) to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Thus the following claims are hereby incorporated into the Description of the Embodiments, with each claim standing on its own as a separate example embodiment.

The invention claimed is:

1. A method of movement correction in a digital camera having a sensor with a plurality of pixels, including a first, second, third and fourth pixel, wherein each pixel includes a photodiode and one or more shift transistors connected so as to shift charge to other pixels, the method comprising:
   dividing an exposure into two or more sub-exposures, including a first and a second sub-exposure;
   exposing the first and second pixels to electromagnetic energy during the first sub-exposure;
   accumulating charge on the photodiodes of the first and second pixels as a function of the electromagnetic energy incident on the first and second pixels during the first sub-exposure;
   shifting the accumulated charge from the photodiodes of the first and second pixels to the photodiodes of the third and fourth pixels, wherein shifting includes determining motion of the digital camera and shifting as a function of the motion of the digital camera;
   exposing the photodiodes in the third and fourth pixels to electromagnetic energy during the second sub-exposure; and
   accumulating additional charge on the photodiodes of the third and fourth pixels as a function of the electromagnetic energy incident of the photodiodes during the second sub-exposure.

2. The method according to claim 1, wherein the plurality of pixels are arranged as repeated arrays of colored pixels and wherein shifting the accumulated charge includes shifting charge between like-color pixels.

3. The method according to claim 1, wherein the method further comprises reading the accumulated charge on each photodiode.

4. The method according to claim 3, wherein the plurality of pixels are arranged as repeated 2 by 2 arrays of red-green and green-blue pixels and wherein shifting the accumulated charge includes shifting charge between like-color pixels.

5. The method according to claim 1, wherein shifting the accumulated charge includes shifting charge in both horizontal and vertical directions.

6. The method according to claim 1, wherein shifting the accumulated charge includes applying clocking signals to transfer gates.

7. The method according to claim 1, wherein accumulating additional charge includes shifting charge accumulated over the first and second sub-exposures to another pixel.

8. A digital camera, comprising:
   a lens;
   a sensor, wherein the sensor includes a plurality of pixels configured as a first, second, third and fourth pixel; and
   a motion detector;
   wherein each pixel includes a photodiode and shift transistors for shifting charge between pixels as a function of motion sensed by the motion detector;
   wherein the sensor is configured to:
      divide an exposure into two or more sub-exposures, including a first and a second sub-exposure;
      expose the first and second pixels to electromagnetic energy during the first sub-exposure;
      accumulate charge on the photodiodes of the first and second pixels as a function of the electromagnetic energy incident on the first and second pixels during the first sub-exposure;
      shift the accumulated charge from the photodiodes of the first and second pixels to the photodiodes of the third and fourth pixels and determine motion of the digital camera and shifting as a function of the motion of the digital camera;
      expose the photodiodes in the third and fourth pixels to electromagnetic energy during the second sub-exposure; and
      accumulate additional charge on the photodiodes of the third and fourth pixels as a function of the electromagnetic energy incident of the photodiodes during the second sub-exposure.

9. The digital camera of claim 8, wherein each pixel further includes a reset transistor, a read transistor and a source follower transistor.

10. The digital camera of claim 8, wherein the shift transistors are designed with overlapping gates such that they act as a Charge Couple Device (CCD).

11. The digital camera of claim 10, wherein each pixel further includes a reset transistor, a read transistor and a source follower transistor.

12. The digital camera of claim 8, wherein the plurality of pixels include first and second colored pixels, wherein the colored pixels are arranged as repeated arrays of colored pixels and wherein the shift transistors are arranged to shift accumulated charge between like-color colored pixels.

13. The digital camera of claim 12, wherein the shift transistors are designed with overlapping gates such that they act as a Charge Couple Device (CCD).

14. The digital camera of claim 8, wherein the plurality of pixels includes pixels arranged as repeated 2 by 2 arrays of red-green and green-blue pixels and wherein the shift transistors transfer charge between like-color pixels.

15. The digital camera of claim 14, wherein the shift transistors are designed with overlapping gates such that they act as a Charge Couple Device (CCD).

* * * * *